May 20, 1958

C. S. MORRISON 2,835,101

RECIPROCATING AUGER FEEDER FOR BALERS

Filed June 7, 1955

INVENTOR.
C. S. MORRISON

United States Patent Office 2,835,101
Patented May 20, 1958

2,835,101

RECIPROCATING AUGER FEEDER FOR BALERS

Charles S. Morrison, Moline, Ill., assignor to Deere & Company, Moline, Ill., a corporation of Illinois Application June 7, 1955, Serial No. 513,699

9 Claims. (Cl. 56—341)

This invention relates to a crop-handling machine in the form of a baler and more particularly to a reciprocating auger for feeding crops from the pick-up means to the associated bale case.

A typical agricultural baler includes a mobile frame adapted to be drawn over a field of previously harvested and windrowed crops by a tractor. The frame carries pick-up means which picks up the windrowed crops and conveys them rearwardly to means operating to feed the crops into an associated bale case, the bale case having an upright wall in which is formed a feed opening for accepting the crops. It is conventional to utilize a cross auger for the purpose of feeding the crops into the bale case, a typical example of which is shown in the U. S. patent to Crumb 2,450,082. As shown in that patent and as is representative of other balers, the auger must be assisted by secondary packer means in the form of feeder fingers operative at the discharge end of the auger to move the crops through the feed opening and into the path of the reciprocating baling plunger. According to the present invention, the baler construction is simplified by the omission of the secondary feeder or packer fingers, which omission is effected by the provision of means for reciprocating the auger so that the auger serves, in addition to its conventional feeding function, as a packer for moving the crops into the path of the reciprocating plunger. The invention features a simple and economical construction by means of which the auger is mounted for reciprocation along its own axis, preferably in time with the baling plunger so that the discharge end of the auger may actually enter the bale case in advance of the plunger. The invention has as an object the provision of a reciprocating auger and drive means therefore that may be readily embodied in many balers of existing construction.

The foregoing and other important objects and desirable features inherent in and encompassed by the invention will become apparent as a preferred embodiment of the invention is disclosed in detail in the following specification and accompanying sheet of drawings, the several figures of which will be described immediately below.

Figure 2:
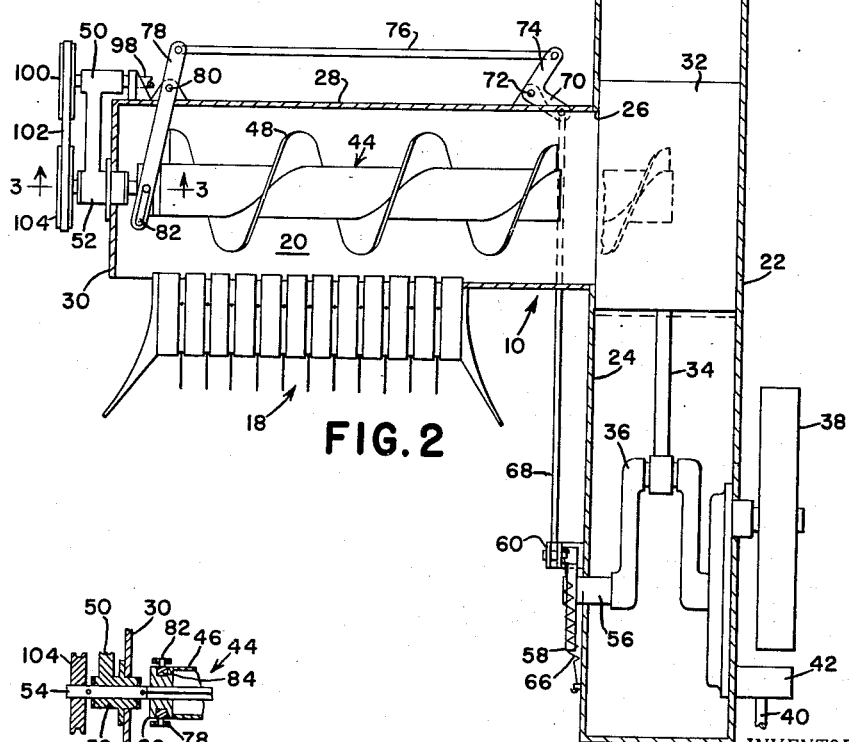
Fig. 2 is an enlarged transverse sectional view of the auger, bale case and pick-up relationship.

As is typical of the conventional baler, the baler chosen here for the purposes of illustration comprises a mobile main frame 10 carried on right and left hand wheels 12 and 14 for advance over a field of previously harvested and windrowed crops, a forwardly extending draft tongue 16 serving as a medium by means of which the baler may be connected to a propelling vehicle such as a tractor (not shown). The main frame carries pick-up means 18 for picking up the windrowed crops and delivering them rearwardly to floor means 20 that leads laterally inwardly to a fore-and-aft extending bale case 22, the bale case having an upright inner or right-hand wall 24 in which is formed a feed opening 26 from which the floor means 20 extends laterally outwardly. The pick-up means is delineated at its rear by a transverse rear wall 28 and is further delineated at its outer or right-hand end by an outer wall which serves as a support 30. A reciprocating bale-forming means or baling plunger 32 is carried in the bale case 22 for cyclic operation on alternate compression and retracting strokes, the plunger being conventionally driven by a pitman 34 and crank shaft 36 on which is a fly wheel 38. Power for driving the crank shaft 36 is derived in the first instance from the tractor (not shown) via a propeller or input shaft 40 which delivers to suitable bevel gearing (not shown) contained in a gear housing 42 (Fig. 2). The details of the driving mechanism are of no moment and are therefore not disclosed with more elaboration.

The outer wall or support 30 of the pick-up means 18 serves to support an auger 44 above the floor means 20, the auger having its axis extending laterally or normal to the length of the bale case 22. The auger shown here comprises a hollow core 46 on which is wound a helical flight 48, the portions of the flight serving as crop-engaging portions operative, when the auger rotates, to move crops over the floor 20 and into the feed opening 26 in advance of the plunger 32. When the plunger 32 is on its compression stroke, as shown in Fig. 2, it covers the feed opening 26. However, when the plunger retracts, it uncovers the feed opening. Hence, crops are introduced through the feed opening 26 and into the bale case 22 during the retracting strokes of the plunger. When the plunger operates on its compression strokes, it compresses the crops into a bale which is ultimately completed and tied by conventional means not important here.

Supporting of the auger 44 on the outer wall or support 30 is accomplished by means of a suitable arm 50, the forward or lower end of which comprises a bearing 52 for journaling a cross shaft 54. The shaft extends laterally inwardly or toward the bale case in cantilever fashion, coaxially through the hollow core 46 of the auger. The auger-received portion of the shaft is preferably of square cross section so as to key the shaft to the auger and yet permit axial movement of the auger relative to the shaft. Any other form of key or splined connection could be used.

The auger is reciprocated by means driven from the plunger-driving means, specifically from a right-hand projecting end 56 of the plunger crank shaft 36. Rigidly secured to the crank shaft end 56 is a cam 58 which operates to oscillate a driving lever 60 pivoted at its lower end at 62 to a frame portion 64 of the main frame 10. The lever 60 is biased against the cam by means of a return spring 66. The lever 60 is connected to a fore-and-aft extending link 68 which is connected to one arm 70 of a bell crank pivoted at 72 to the main frame and having a second arm 74. The pivotal mounting of the bell crank at 72 is representative only.

Figure 3:
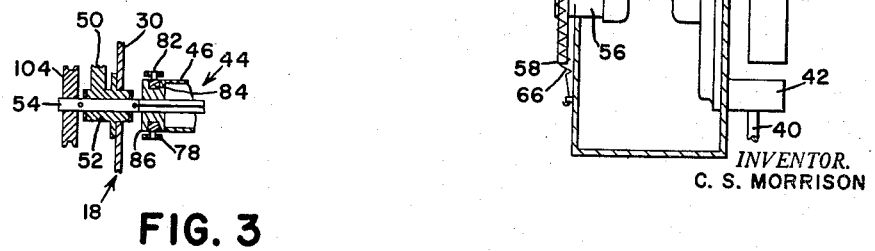
Fig. 3 is a fragmentary section as seen along the line 3—3 of Fig. 2.

The second arm 74 of the bell crank is connected by a cross link 76 to the rear end of an auger-reciprocating lever 78, which lever is pivoted intermediate its ends at 80 on the main frame and which lever has at its forward end a pivot and slot connection 82 with a yoke or ring 84 that is received in a collar 86 at the outer end of the auger 44 (Fig. 3). Since the shaft 54 is axially fixed in the bearing 52, the auger 44 is reciprocated relative to the shaft as the driving linkage just described is operated. That is to say, as the crank shaft 36 rotates, the high and low spots on the cam are presented alternately to the lever 60, resulting in fore-and-aft oscillation of the lever and fore-and-aft reciprocation of the link 68, which motion is transmitted through the bell crank 70—74 to the cross link 76 and in turn to the auger-reciprocating lever 78. The extent of reciprocation of the auger is such that it moves from the full line position of Fig. 2 to the dotted line position of Fig. 2. Since it is preferred that the discharge end of the auger enter the bale case, reciprocation of the auger must be timed with that of the plunger. In other words, the discharge end of the auger should enter the bale case 22 as the plunger 32 recedes or is retracted. As will be seen, the timed relationship is established by the position of the cam 58 relative to the throw of the plunger crank shaft 36. As illustrated, the lever 60 is engaging the low spot of the cam 58 while the plunger 32 is at the end of its compression stroke. As the crank shaft rotates to retract the plunger, the high spot of the cam approaches and contacts the lever 60, thus effecting inward movement or projection of the auger 44. Reverse movement of the auger 44 is accomplished as the plunger 32 again moves forward on its compression stroke.

Figure 1:
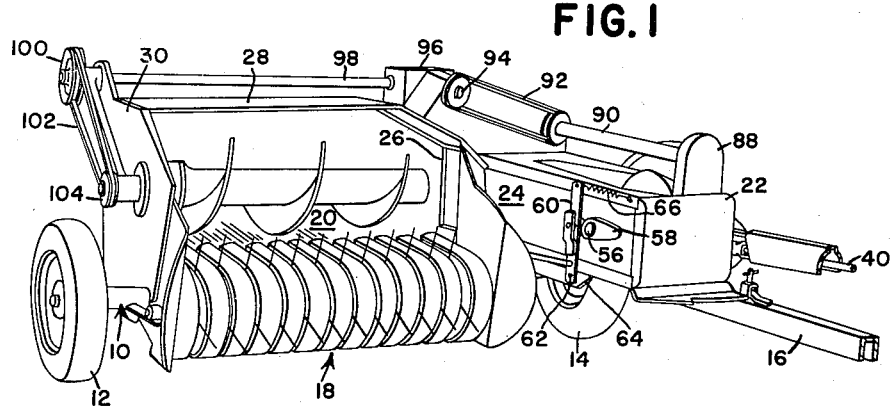
Fig. 1 is a front perspective view of a representative baler embodying the invention.

Drive for rotating the auger is carried from the input shaft 40 by suitable gearing (not shown) contained in safety shielding 88 (Fig. 1), from which a rearwardly extending shaft 90 projects to afford a belt and sheave connection 92 with a fore-and-aft shaft 94 that enters a gear casing 96. This gear casing contains suitable bevel gearing (not shown) for driving a cross shaft 98 to the outer end of which is keyed a sheave 100. A belt 102 connects the sheave 100 with a second sheave 104 keyed to the outer end of the auger shaft 54. Thus, the shaft 54 serves not only to support the auger 44 but also to rotate the auger.

It will be seen from the foregoing that a simple and economical construction has been provided by combining the rotating and reciprocating functions of an auger, to the extent that secondary feeders are omitted. The timed relationship between the reciprocation of the auger and the reciprocation of the plunger increases the efficiency of the machine and improves the bales formed thereby.

Various features of the invention not specifically enumerated herein will undoubtedly occur to those versed in the art, as will various other modifications and alterations in the preferred embodiment of the invention as disclosed, all of which may be achieved without departing from the spirit and scope of the invention.

What is claimed is:

1. A baler, comprising: a mobile frame including an elongated bale case having an upright side wall formed with a feed opening, and a baling plunger mounted in the bale case for reciprocation lengthwise thereof to alternately cover and uncover the feed opening; drive mechanism, including means for reciprocating the plunger; crop pick-up means connected to the frame and including floor means extending laterally outwardly from the upright side of the bale case and leading to the feed opening; an outer support on the frame spaced laterally outwardly from the feed opening; a rotatable auger positioned over the floor means with its axis transverse to the bale case and alined with the feed opening, said auger having inner and outer ends respectively proximate to the feed opening and the outer support; mounting means on the outer support and sustaining the auger for bodily movement thereof back and forth away from and toward the bale case to successively withdraw and project the inner end of said auger through the uncovered feed opening; drive means connected to the auger and to the aforesaid drive mechanism for shifting the auger bodily as aforesaid in timed relation with reciprocation of the plunger so as to project and withdraw the inner end of the auger through the feed opening respectively during uncovering and covering of said opening by the plunger; and auger-rotating means on the frame and connected to the auger for rotating the auger during back and forth movement thereof.

2. The invention defined in claim 1, in which: the mounting means includes a shaft supported by the outer support and extending coaxially inwardly through the auger as a cantilever, and the auger is axially slidable back and forth on the shaft by the drive means.

3. The invention defined in claim 2, in which: the shaft is journaled in the outer support and is keyed to the auger, and the auger-rotating means is connected to said shaft.

4. The invention defined in claim 1, in which: the drive mechanism includes a crank shaft connected to the plunger and rotatable on an axis transverse to the bale case, said crank shaft having an outer portion coaxial with said crank shaft axis, a cam on said outer portion, and drive link means connected to the auger and powered by the cam.

5. The invention defined in claim 4, in which: the drive link means includes a cam-driven lever movable back and forth lengthwise of the bale case, a bell crank having one arm connected to the lever for back and forth movement lengthwise of the bale case and a second arm movable back and forth in the direction of the auger axis, and a bell-crank-driven lever connected to the second arm of the bell crank and to the auger and fulcrumed on the mobile frame.

6. A baler, comprising: a mobile frame including an elongated bale case having an upright side wall formed with a feed opening, and a baling plunger mounted in the bale case for reciprocation lengthwise thereof to alternately cover and uncover the feed opening; drive mechanism, including means for reciprocating the plunger; crop pick-up means connected to the frame and including floor means extruding laterally outwardly from the upright side of the bale case and leading to the feed opening; an outer support on the frame spaced laterally outwardly from the feed opening; an elongated driveable conveyor positioned over the floor means with its length transverse to the bale case and alined with the feed opening, said conveyor having crop-engaging portions spaced apart and movable lengthwise thereof toward the feed opening for moving crops over said floor and toward said opening; said conveyor having inner and outer ends respectively proximate to the feed opening and the outer support; mounting means on ithe outer support and sustaining the conveyor for bodily shifting thereof back and forth away from and toward the bale case to successively withdraw and project the inner end of said conveyor through the uncovered feed opening; conveyor-shifting means connected to the conveyor and to the aforesaid drive mechanism for continuously shifting the conveyor bodily as aforesaid in timed relation with reciproccation of the plunger so as to project and withdraw the inner end of the conveyor through the feed opening respectively during uncovering and covering of said opening by the plunger; and conveyor-driving means on the frame and connected to the conveyor for continuously moving the crop-engaging portions thereof during back and forth shifting of said conveyor.

7. A baler, comprising: a mobile frame including an elongated bale case having an upright side wall formed with a feed opening, and a baling plunger mounted in the bale case for reciprocation lengthwise thereof to alternately cover and uncover the feed opening; drive mechanism, including means for reciprocating the plunger; crop pick-up means connected to the frame and including floor means extending laterally outwardly from the upright side of the bale case and leading to the feed opening; an outer support on the frame spaced laterally outwardly from the feed opening; a rotatable auger positioned over the floor means with its axis transverse to the bale case and directed toward the feed opening, said auger having inner and outer ends respectively proximate to the feed opening and the outer support; mounting means on the outer support and sustaining the auger for bodily movement thereof back and forth away from and toward the bale case to successively retract and project the inner end of said auger relative to the uncovered feed opening; drive means connected to the auger and to the aforesaid drive mechanism for shifting the auger bodily as aforesaid in timed relation with reciprocation of the plunger so as to project and retract the inner end of the auger relative to the feed opening respectively during uncovering and covering of said opening by the plunger; and auger-rotating means on the frame and connected to the auger for rotating the auger during back and forth movement thereof.

8. A baler, comprising: a mobile frame including a bale case having walls, one of said walls including a feed opening into which material is introduced, and a bale-forming means carried in the bale case for cyclic operation to engage material introduced through said opening; drive mechanism, including means for effecting said cyclic operation of the bale-forming means; crop pick-up means connected to the frame and including floor means leading to the aforesaid one wall having the feed opening; a rotatable auger positioned over the floor means with its axis directed toward the feed opening, said auger having a near end proximate to and a far end remote from said opening; a support at said remote end of the auger and sustaining said auger for bodily shifting movement on alternate material-feeding and retracting strokes to facilitate the introduction of material into the feed opening; drive means connected to the auger and to the aforesaid drive mechanism for continuously shifting the auger in timed relation to the cyclic operation of the bale-forming means; and means for continuously rotating the auger.

9. A baler, comprising: a mobile frame including a bale case having walls, one of said walls including a feed opening into which material is introduced, and a bale-forming means carried in the bale case for cyclic operation to engage material introduced through said opening; drive mechanism, including means for effecting said cyclic operation of the bale-forming means; crop pick-up means connected to the frame and including floor means leading to the aforesaid one wall having the feed opening; a drivable conveyor positioned over the floor means and having crop-engaging portions spaced apart and movable toward the feed opening, said conveyor having a near end proximate to and a far end remote from said opening; a support at at least one end of the conveyor and sustaining said conveyor for bodily shifting movement on alternate material-feeding and retracting strokes to facilitate the introduction of material into the feed opening; drive means connected to the conveyor and to the aforesaid drive mechanism for continuously shifting the conveyor in timed relation to the cyclic operation of the bale-forming means; and conveyor-driving means for continuously driving the crop-engaging portions of said conveyor independently of shifting of said conveyor.

References Cited in the file of this patent

UNITED STATES PATENTS

| Re. 21,132 | Innes | June 27, 1939 |
|---|---|---|
| 2,030,031 | Innes | Feb. 4, 1936 |
| 2,067,583 | Stark | Jan. 12, 1937 |
| 2,571,489 | Russell | Oct. 16, 1941 |

FOREIGN PATENTS

| 153,133 | Australia | Sept. 8, 1953 |